United States Patent [19]
Wicks et al.

[11] Patent Number: 4,719,799
[45] Date of Patent: Jan. 19, 1988

[54] HEAD FOR A BUBBLE TUBE

[75] Inventors: Douglas B. Wicks; Dennis W. Johnson; William S. C. Brooks; Terry J. Nelson, all of Saskatoon, Canada

[73] Assignee: Sci-Tec Instruments Inc., Saskatoon, Canada

[21] Appl. No.: 880,545

[22] Filed: Jun. 30, 1986

[30] Foreign Application Priority Data

Jan. 31, 1986 [CA] Canada ................................... 500905

[51] Int. Cl.⁴ .......................... G01F 23/00; G01L 7/00; G01N 9/28
[52] U.S..Cl. ........................................ 73/302; 73/439; 73/700
[58] Field of Search ........................... 73/302, 439, 700

[56] References Cited
U.S. PATENT DOCUMENTS 1,964,253  6/1934  Dienner .................................. 73/302
3,922,915 12/1975  Andrews ................................ 73/302

Primary Examiner—Donald O. Woodiel
Attorney, Agent, or Firm—Pascal & Associates

[57] ABSTRACT

Apparatus for sensing hydrostatic pressure in a fluid, forming a head for a bubble tube for immersion into the fluid. The head is formed of a plate having a flat lower surface for horizontal disposition within a liquid, a first orifice for introducing a gas under pressure from above the plate whereby the gas can form a bubble under the plate within the liquid. The effect of the plate is as a surface on which a stable sessile bubble of a variable size can be grown. This results in a bubble having a substantially increased radius of curvature at its interface, that is, the gas/liquid interface, on the underside of the bubble than previously obtainable. A pressure gauge measuring the gas pressure in the tube determines the pressure at the end of the tube within the fluid.

16 Claims, 4 Drawing Figures

HEAD FOR A BUBBLE TUBE

This invention relates to apparatus for sensing hydrostatic pressure in a fluid and in particular to a head for a bubble tube used in such apparatus.

Hydrostatic pressure at a given depth of a fluid such as a liquid can be measured by immersing the end of a tube into the fluid to the given depth, then applying a gas into the tube from its other end. The pressure of the gas is increased until a bubble forms at the immersed end, where the pressure is to be measured. It is assumed that the internal pressure of the bubble becomes constant, and equal to the hydrostatic pressure of the liquid. By measuring the gas pressure in the tube at the end of the tube outside the liquid, an indication of the pressure at the immersed end of the tube, i.e. at the given depth is obtained.

It has been found, however, that due to the changing radius of curvature of the bubble as it grows at the immersed end of the tube, accurate and consistent pressure measurements are difficult to obtain.

The pressure in the bubble increases at first, as the bubble grows and as the radius of curvature decreases. When a bubble is large enough to be taken as spherical, the smallest radius of curvature and the maximum pressure occurs when the bubble is a hemisphere. Further growth causes the pressure to decrease so that the bubble becomes unstable and breaks off. Clearly both variation of pressure measured and instability of the bubble is observed.

In addition, once the bubble has broken pressure oscillations are experienced. While the bubble is being formed, turbulence in the surrounding fluid can disturb the bubble and sometimes break it.

Prior art patents which use bubble tubes have typically provided a means for the bubble to break, whereby a constant stream of small bubbles are released from the tube. Such structures are described in U.S. Pat. Nos. 2,668,438 issued Feb. 9th, 1954 to C. M. Marquardt and 2,755,669 issued July 24th, 1956 to R. B. Beard and generally relate to the use of a vertical tube having orifices of various shapes along their sides to facilitate easy egress of the gas contained within the tube. Presumably the easy egress of the gas and formation of a stream of bubbles provide for those inventors a sufficiently accurate pressure measurement.

However the present invention allows considerable increase in the accuracy of pressure measurement. The invention facilitates growth of a bubble at the end of a pressure tube to a substantially larger size than could previously be obtained. The effect of this is to increase the radius of curvature of the bubble to a very large value, allowing growth of the bubble to a radius which can be predefined and controlled. Pressure increment across the bubble can thereby be substantially eliminated as will be seen below.

The above advantages are obtained in a head for a bubble tube comprising a plate having a flat lower surface for horizontal disposition within a liquid, a first orifice for introducing a gas under pressure from above the plate whereby the gas can form a bubble under the plate within the liquid. The effect of the plate is as a surface on which a stable sessile bubble of a variable size can be grown. This results in a bubble having a substantially increased radius of curvature at its interface, that is, the gas/liquid interface, on the underside of the bubble than previously obtainable.

Care must be exercised when selecting the material from which the bubble plate is constructed. The wetting characteristics of the liquid must be matched to the bubble plate material to ensure adequate bubble formation and rapid damping after a bubble breakage. For immersion into gasoline it was experimentally determined that Teflon TM is a suitable bubble plate material.

In order to prevent the form of bubble from being disturbed due to turbulences in the surrounding liquid, the formed bubble is preferably enclosed by a housing which descends from the plate.

A better understanding of this invention will be obtained upon a reading of the detailed description below with reference to the following drawings, in which.

Figures 1, 2:
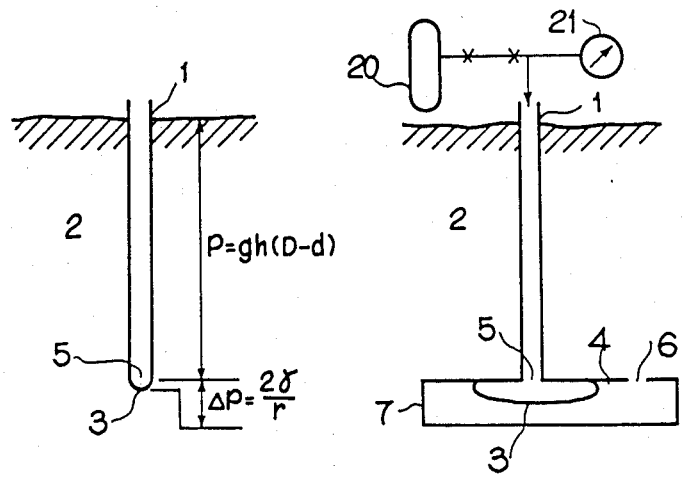
FIG. 1 illustrates a pressure tube.
FIG. 2 illustrates a pressure tube according to the present invention.

As shown in FIG. 1 a tube 1 is immersed into a liquid 2 whose pressure is to be determined at a depth which is at the bottom end of the tube. A gas (e.g. air) is applied under pressure from a supply 20 to the external end of the tube. A bubble 3 of air grows (shown as a hemisphere) at the bottom of the tube.

As indicated earlier, the pressure in the bubble increases at first, as the bubble grows and as the radius of curvature decreases at the gas/liquid interface on the underside of the bubble. When a bubble is small enough to be taken as spherical, the smallest radius of curvature and the maximum pressure occurs when the bubble is in a hemisphere. Further bubble growth causes the pressure to decrease, so that the bubble becomes unstable and breaks off. The point at which the pressure is maximum is given by:

$$P + \Delta P = gh(D - d) + 2\gamma/r \tag{1.}$$

where $P = hg(D-d)$ is the part of the pressure required to force the liquid originally in the tube down to the depth h, the depth h is the depth of the bottom of the bubble below the fluid surface, g is the acceleration due to gravity, D is the density of the fluid, and d is the density of the gas (air) in the bubble.

The remaining portion $\Delta P$ is the pressure increment across the bubble, where $\gamma$ is the surface tension, and r is the radius of the bubble.

FIG. 2 illustrates in schematic view the present invention. A head for the bubble tube comprising a plate 4, referred to herebelow as a bubble plate, has a first orifice 5 which is attached to the tube 1. As the gas pressure from supply 20 in tube 1 increases, the bubble 3 is formed. The bubble plate 4 is used as a surface on which a stable sessile bubble of variable size can be grown. The gas pressure in the tube is monitored by a gauge 21 or other pressure monitor.

Clearly the result of the use of the bubble plate is to effectively increase the radius of curvature of the bubble to a large value (for the purpose of the equation noted above, essentially infinite relative to the numerator of the portion where the radius factor is present), thus substantially eliminating the ΔP contribution from the equation.

The resulting pressure measurement thus is virtually dependent on the depth, the acceleration of gravity, and the difference of the densities between the liquid and the gas. The pressure increment across the bubble has been substantially eliminated.

It should be noted that care must be exercised when selecting the material of the bubble plate where the bubble is formed. The wetting characteristic of the fluid must be matched to the bubble plate material to ensure adequate bubble formation and rapid damping after bubble breakage. In general, the material should be chosen so that the wetting characteristics of the fluid will produce a bubble with a contact angle of less than 90° to the bubble plate.

This can be obtained by the selection of the material of the underside of the bubble plate, or by attaching a layer of material to the underside of the bubble plate having appropriate characteristics. For gasoline liquid, it was determined that Teflon TM is a suitable bubble plate material, or is suitable material fixed on a layer on the underside of the bubble plate facing the liquid and bubble.

In order to ensure that the bubble should remain sessile, the bubble plate should of course remain substantially horizontal during use. In addition the undersurface of the bubble plate (or the layer affixed to it which faces the bubble) should be flat.

In order to control the size of the bubble which is formed, a second orifice 6 should be provided in the bubble plate a predetermined distance from the first orifice. When the bubble size is sufficient such that it reaches the second orifice, the bubble will break.

The second orifice can be comprised of a hole, it can be formed of a slot, it can be a slot having an axis which is a constant distance from the first orifice, or can be some other shape or size.

In order to prevent the bubble from being broken or disturbed due to turbulence in the surrounding fluid, it is preferred that the bubble should be contained within a housing 7. The housing descends from below, the bubble plate; i.e. the plate can form an upper wall to the housing.

Figures 3A, 3B:
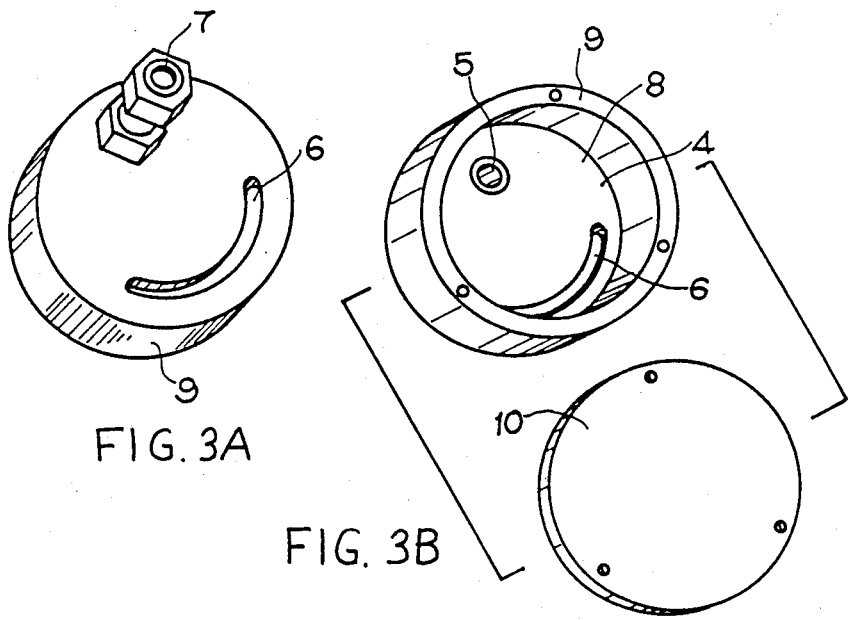
FIG. 3A is a perspective view illustrating the top of the preferred form of the invention.
FIG. 3B is a perspective view taken from the bottom of the preferred form of the present invention.

FIG. 3A illustrates a preferred form of the invention in perspective from the top. The first orifice has a pipe connector 7 attached to which the pressure tube 1 can be connected. The second orifice is in the form of a curved slot having an axis which is a constant distance from the first orifice.

FIG. 3B illustrates in perspective the invention as seen from the bottom. The bottom surface of the bubble plate is covered by a Teflon TM layer 8 over the portion where the bubble is to be formed. The housing 7 is formed of side walls 9 and a bottom cap 10 which is screwed to the bottom of the side walls.

In operation, the head as described, with pressure tube 1 attached (without pressure applied) is immersed in the liquid. The liquid enters the second orifice 6, forcing whatever air may be contained within the housing up the tube 1, which air is followed by the liquid. Once the level of liquid has become stable in tube 1, gas (e.g. dry air) is applied to the outer end of tube 1 forcing the liquid down the tube, through the housing and out of the second orifice 6. A pressure gauge can measure the applied pressure, which will increase as the liquid is forced lower in tube 1. When the gas reaches the bottom of the tube 1, it will spread outwardly forming an increasing radius bubble, as shown in FIG. 2. At that point the pressure will remain substantially constant and will be equal to the hydrostatic pressure at the height corresponding to the lower interface between the gas and liquid.

Alternatively the bubble can be allowed to grow until it reaches the second orifice 6. The pressure taken prior to the resulting breakage of the bubble will be the indicated liquid pressure.

A person understanding this invention may now conceive of variations or alternative structures using the principles described herein. All are considered to be within the sphere and scope of the invention as defined in the claims appended hereto.

We claim:

1. A head for a bubble tube comprising a plate having a flat lower surface for horizontal disposition within a liquid, the plate having a first orifice for introducing gas under pressure from above the plate whereby the gas can form a bubble under the plate within the liquid and means for supplying said gas to said orifice above the plate.

2. A head for a bubble tube as defined in claim 1, in which the lower surface of the plate is formed, or has an outer layer, of material having wetting characteristics by the liquid such that the contact angle of said bubble with said plate or outer layer is less than 90 degrees.

3. A head for a bubble tube as defined in claim 1 in which the plate contains a second orifice a predetermined distance from the first orifice for facilitating breakage of the bubble when the bubble grows to reach the second orifice.

4. A head for a bubble tube as defined in claim 3 including a hollow housing surrounding and descending below said plate.

5. A head for a bubble tube as defined in claim 3, in which the liquid is gasoline, the gas is air and said lower surface or outer layer is Teflon TM.

6. A head for a bubble tube as defined in claim 5, in which said second orifice is a slot.

7. A head for a bubble tube as defined in claim 6, in which said slot has an axis which is located a constant distance from the first orifice.

8. A head for a bubble tube as defined in claim 3, in which the lower surface of the plate is formed, or has a flat outer layer, of material having wetting characteristics by the liquid such that the contact angle of said bubble with said plate or outer layer is less than 90 degreees.

9. A head for a bubble tube as defined in claim 8, including a hollow housing surrounding and depending below said plate.

10. A head for a bubble tube as defined in claim 8, in which the liquid is gasoline, the gas is air and said lower surface or outer layer is Teflon TM.

11. A head for a bubble tube as defined in claim 10, in which said second orifice is a slot having an axis which is located a constant distance from the first orifice.

12. A head for a bubble tube as defined in claim 11, further including a fastener for a pipe fixed to said first orifice.

13. A pressure sensor comprising a tube, means for applying gas pressure to the tube, means for measuring gas pressure within the tube, and a plate fixed and sealed to the end of the tube having a flat lower surface for horizontal disposition within a liquid, the plate having an orifice communicating with the interior of the tube, whereby said plate can be horizontally disposed at a predetermined depth within a liquid, a bubble can be formed at the end of the tube supported by the plate, and the gas pressure can be measured.

14. A pressure sensor as defined in claim 13, in which the plate contains a second orifice a predetermined distance from the first orifice for facilitating breakage of the bubble when the bubble grows to reach the second orifice.

15. A pressure sensor as defined in claim 14, in which the lower surface of the plate is formed, or has an outer layer, of material having wetting characteristics by the liquid such that the contact angle of said bubble with said plate or outer layer is less than 90 degrees.

16. A pressure sensor as defined in claim 15, including a hollow housing surrounding and descending below said plate.

* * * * *